United States Patent [19]

Boice

[11] 4,319,614
[45] Mar. 16, 1982

[54] SALAD DRESSING BOTTLE AND TOP STOPPER WITH INDIVIDUAL SERVER

[76] Inventor: William E. Boice, 1708 Japonica La., Plano, Tex. 75074

[21] Appl. No.: 134,861

[22] Filed: Mar. 28, 1980

[51] Int. Cl.³ .............................................. B65B 3/30
[52] U.S. Cl. ...................................... 141/381; 220/23
[58] Field of Search ................................. 141/319–322, 141/379–381; 215/6; 222/454, 457; 220/23

[56] References Cited

U.S. PATENT DOCUMENTS

| 700,596 | 5/1902 | Ahlberg | 141/381 |
| 2,403,299 | 7/1946 | Pickin | 141/322 X |
| 2,762,526 | 9/1956 | Gilmour | 141/381 X |

Primary Examiner—Frederick R. Schmidt
Attorney, Agent, or Firm—Warren H. Kintzinger

[57] ABSTRACT

A salad dressing dispenser, in the form of a bottle having a top stopper with a depending individual server in the form of a suspended cup into which an individual serving may be placed by tilting the bottle and shaking the contents to insure proper distribution of salad dressing ingredients entering the individual serving cup.

8 Claims, 5 Drawing Figures

U.S. Patent  Mar. 16, 1982  4,319,614
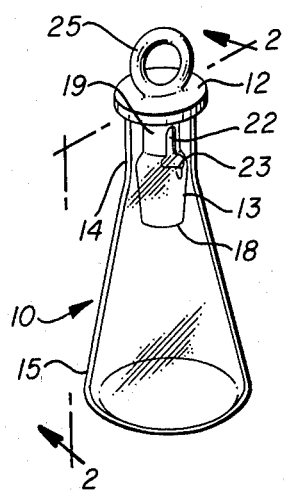
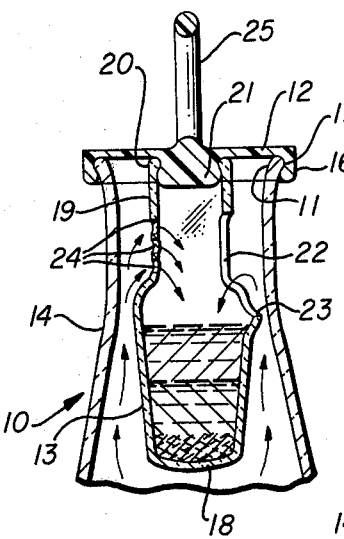
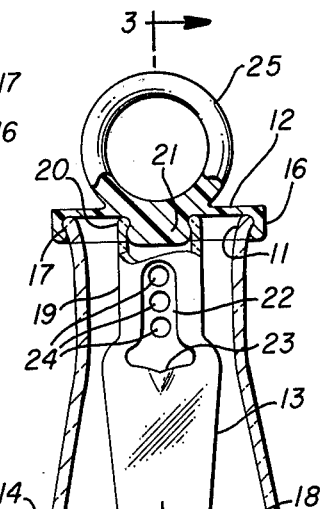
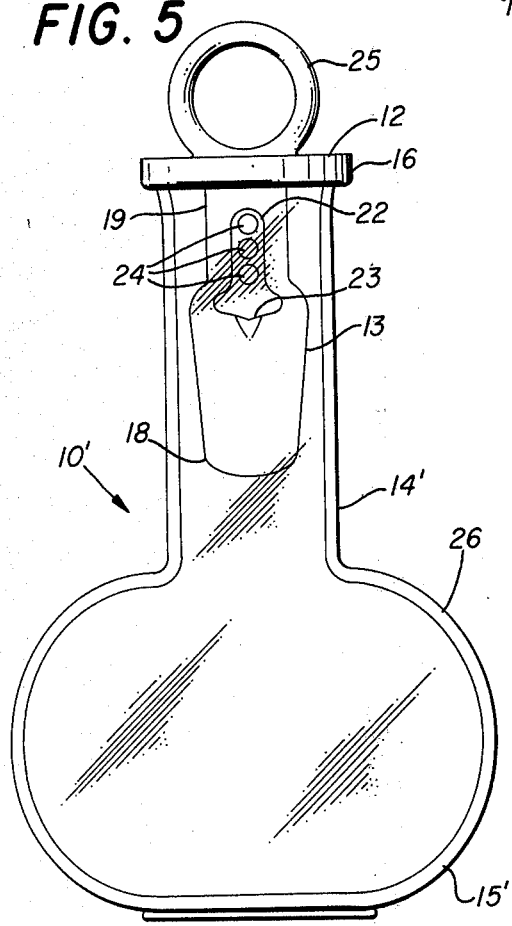
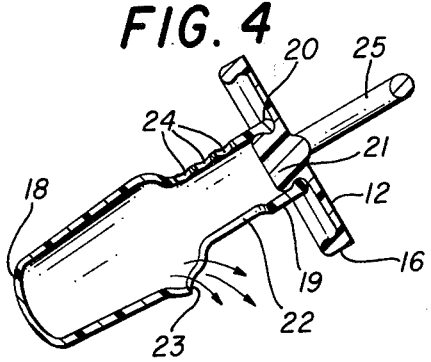

SALAD DRESSING BOTTLE AND TOP STOPPER WITH INDIVIDUAL SERVER

This invention relates in general to salad dressing dispensing containers, and more particularly, to a salad dressing bottle for mixed salad dressing material having a top stopper equipped with an individual serving cup.

Salad dressing containers generally in the form of bottles that have been used through the years have a problem with mixtures of different specific gravity items—different fluids and entrained solid matter seasoning particles—in that, for example, shaking a bottle of vinegar and oil along with in many instances solid seasoning particles and then the contents settling before the mixture can be poured on the salad. Hence, it is important to be able to shake a bottle and at the time have a portion of the mixture containing evenly distributed parts of oil, vinegar and solids separated and held apart at the neck of the bottle, and for such separated portion to be pourable from the container without simultaneously pouring from the main contents of the bottle. Further, it is desirable that no matter how long a salad dressing bottle stands after shaking that when picked up to pour a serving of dressing the salad receives an evenly distributed mixture of all the dressing constituents—oil, vinegar and solids.

It is, therefore, a principal object of this invention to provide a salad dressing dispenser that enables the application of properly mixed individual servings of salad dressing to salads.

Another object is to provide a salad dressing dispenser that with proper handling, insures predictably uniform mixture of the different weight ingredients in a multi-fluid plus solids dressing between individual servings.

A further object is to provide a salad dressing dispenser with an individual serving containing portion that is an extension of the dispenser top opening stopper to insure that only an individual serving is applied at one time with the dispenser.

Features of the invention useful in accomplishing the above objects include in a salad dressing mixer and serving dispensing container, an individual serving sized pocket in the form of a cup extension from the container top opening stopper. The cup extension extends from the top stopper down into the upper neck portion of the bottle where the openings at the top in the interconnection between the cup and the stopper salad dressings may enter in properly distributed form as the bottle is tilted and shaken with the stopper in place and then turned upright again. The cup is also provided with a pouring lip at a suitable opening that may be conveniently used by one holding the stopper top when it is removed from the container for a serving.

Specific embodiments representing what are presently regarded as the best mode of carrying out the invention are illustated in the accompanying drawing.

In the drawing:

FIG. 1 represents a perspective view of a salad dressing dispensing bottle with an individual serving sized cup suspended from a top opening stopper in the upper neck of the bottle;

FIG. 2, a sectioned view of the bottle taken along line 2—2 of FIG. 1;

FIG. 3, a partial sectioned view of the cup beneath the stopper in neck area of the bottle taken along line 3—3 showing the serving sized cup pocket filled with salad dressing fluids and solid seasonings;

FIG. 4, a sectioned view of the bottle top stopper and cup as tilted to pour contents of the cup to an individual salad while other salad dressing contents of the bottle remain in the bottle; and FIG. 5, a side elevation view of an alternate salad dressing bottle with many features in common with the bottle of FIGS. 1-4.

Referring to the drawing:

The salad dressing container and individual serving dispensing bottle 10 of FIG. 1, with additional reference to FIGS. 2, 3 and 4, is shown to be a bottle container having a top opening 11 stopper 12 with an individual serving cup 13 suspended therebeneath that, with the stopper in place on the top opening 11 of the bottle 10, extends down in bottle neck 14. The bottle is formed with the upper neck 14 extending from fluid communication with the reservoir section 15 to the upper opening 11 adapted to receive a tight fitting plastic lid or stopper 12 thereover that when in place seals the top of the bottle. The plastic lid or stopper 12 has an outer edge depending skirt 16 that resiliently encloses the rim 17 of bottle top opening 11. Obviously, screw or plug top closures could be used in place of lid or stopper 12.

The server cup 13 that is suspended from stopper 12 has a lower cup body 18, of proper volume for holding an individual serving of salad dressing, has a neck portion 19 extended to an upper squeeze-fitted bead 20 end tightly fitted on stopper bottom projection 21. It should be noted that the server cup 13 and stopper 12 could be molded together effectively as one piece. The neck portion 19 of server cup 13 includes a large opening 22 that acts as a mouth opening that catches the complete mixture by individual portions. The opening 22 also includes a lower pouring lip 23 that facilitates easy pour serving of salad dressing on individual servings. The neck portion 19 of the server cup 13 also has a plurality of holes 24 to the other side from opening 22 and generally much smaller than opening 22 to facilitate free flow of all ingredient elements making up the salad dressing while shaking the container and mixture to reduce likelihood of any one part of the mixture being trapped in greater out of proportion quantity than desired. The salad dressing bottle with the individual server equipped stopper is especially useful in dispensing individual servings of, for example, oil and vinegar type dressings with included solids. When the top closure stopper is secure and the bottle containing dressing is tilted and/or shaken the suspended serving cup catches proportionate quantities of the elements (oil, vinegar, herbs and/or other seasoning). The stopper with the cup may then be removed and a properly balanced individual serving of salad dressing leisurely applied to an individual salad with the cup manually held by the stopper and tilted for pouring as shown in FIG. 4. Stopper 12 may be provided with a holding pull-ring 25 as shown or not as may be the case with some embodiment variations.

The salad dressing container and individual serving dispensing bottle 10' of FIG. 5 is another bottle configuration with the bottom an enlarged bulbous reservoir 26 with a straight neck 14' thereabove extended to the top opening. The stopper 12 and cup 13 with this bottle are the same as with the bottle 10 of FIGS. 1-3 with operational use the same.

Whereas this invention is herein illustrated with respect to several embodiments thereof, it should be realized that various changes may be made without departing from essential contributions to the art made by the teachings hereof.

I claim:

1. A salad dressing bottle with an individual server equipped top stopper including: a bottle with a salad dressing reservoir portion having a bottom shaped to hold the bottle in an upright position when placed on a flat supporting surface; an upper neck extension from said reservoir portion terminating in an upper neck lip rim defining a bottle opening subject to being selectively closed and opened with a stopper; a stopper shaped to close the bottle opening; an individual server in the form of a cup suspended from the bottom of said stopper within said bottle upper neck extension when said stopper is in place closing said bottle opening and freely removable from said bottle with said stopper when the stopper is removed with the individual server for the pouring of salad dressing therefrom to an individual salad; opening means in said cup for proper distribution of salad dressing ingredients entering the individual serving cup with tilting and shaking of the bottle and the stopper in place closing said bottle opening and the individual server in the upper neck extension of the bottle, wherein said cup suspended from the bottom of said stopper includes a lower cup body and a neck portion interconnecting said lower cup body and said bottom of said stopper and fastening means between said cup and said stopper;

wherein said opening means includes an opening positioned in said neck portion defining at the lower extent of said opening a pouring lip at the top of said lower cup body; and wherein said opening means also includes a plurality of openings in said neck portion in addition to said opening with the pouring lip at the top of said lower cup body.

2. The salad dressing bottle with an individual server equipped top stopper of claim 1, wherein said plurality of openings in said neck portion are of smaller size than said opening with the pouring lip at the top of said lower cup body.

3. The salad dressing bottle with an individual server equipped top stopper of claim 2, wherein said plurality of openings in said neck portion are of less total area than the area of said opening with the pouring lip at the top of said lower cup body.

4. The salad dressing bottle with an individual server equipped top stopper of claim 3, wherein said plurality of openings in said neck portion are generally to the opposite side of said neck portion from said opening with the pouring lip at the top of said lower cup body.

5. The salad dressing bottle with an individual server equipped top stopper of claim 4, wherein said lower cup body is of bulbous larger diameter than said neck portion.

6. The salad dressing bottle with an individual server equipped top stopper of claim 1, wherein said fastening means between said cup and said stopper includes a stopper bottom projection; and a squeeze fitted bead upper end on the neck portion squeeze fitted on said stopper bottom projection.

7. The salad dressing bottle with an individual server equipped top stopper of claim 1, wherein said top stopper is a flexible material molded lid having a skirt flange that fits over said lip rim in sealing contiguous engagement therewith to securely close the bottle opening and yet be flexible for repeated removal of the lid for individual servings and repositioning of the lid in place on the top of the bottle for repeated shaking of the container and ingredients held therein and for entry of servings of mixed salad dressing to said individual serving sized salad dressing containing lower cup body.

8. The salad dressing bottle with an individual server equipped top stopper of claim 7, wherein said upper lip rim is formed with an outer bead-like protrusion extending around the peripheral extent of said upper lip rim.

* * * * *